UNITED STATES PATENT OFFICE.

JOHN R. MacMILLAN AND JOSEPH L. K. SNYDER, OF NIAGARA FALLS, NEW YORK, ASSIGNORS TO NIAGARA ALKALI COMPANY, OF NIAGARA FALLS, NEW YORK, A CORPORATION OF NEW YORK.

PROCESS OF MAKING PERMANGANATES.

1,387,656.  Specification of Letters Patent.  Patented Aug. 16, 1921.

No Drawing.   Application filed August 13, 1920.  Serial No. 403,428.

*To all whom it may concern:*

Be it known that we, JOHN R. MACMILLAN and JOSEPH L. K. SNYDER, citizens of the United States, and residing in Niagara Falls, in the county of Niagara and State of New York, have invented certain new and useful Improvements in Processes of Making Permanganates, of which the following is a specification.

This invention relates to processes of making permanganates; and it comprises a method of forming permanganates wherein material of the nature of a manganate roast containing manganates and other manganese compounds is further oxidized in the presence of preformed permanganates; and, more specifically, it comprises a process of oxidizing such a manganate material with chlorin wherein such a material is made into a magma or mixture with a liquid containing permanganate and such magma or mixture is chlorinated; all as more fully hereinafter set forth and as claimed.

In one of the ordinary ways of making permanganates, manganese ore or other material containing manganese dioxid is mixed with an alkali, usually soda, and the mixture given an oxidizing roast to form manganate; the roasted material being then treated with chlorin in the presence of water to form permanganate. For the present purposes, the manganates may be assumed to contain $MnO_3$ and the permanganates, $Mn_2O_7$.

In the oxidizing roast the $MnO_2$ combines with the alkali and some, but not all of that which so combines is oxidized to $MnO_3$; further oxidation ceasing when a certain balance exists between $MnO_2$ and $MnO_3$. In other words, the roasted material is, for the present purposes, a mixture of alkali manganite and manganate. On treatment with water, the manganate goes into solution while the manganite breaks up with production of free alkali in solution and a precipitate of hydrated, readily reactive manganese dioxid containing more or less retained alkali. When the magma produced by treatment of the roasted material with a limited amount of water and containing the stated substances is chlorinated, an amount of permanganate varying with conditions is formed; part of the permanganate presumably coming from the oxidation of $2MnO_3$ to $Mn_2O_7$ and another part coming from the oxidation of some of the $MnO_2$. Oxidation is favored by various catalysts.

We have found that the oxidation during the chlorination stage is much facilitated and made further-going by the presence of preformed permanganate; the utilization of the chlorin being better, more of the manganese being oxidized to permanganate and liquors containing a greater concentration of permanganate being obtainable. In the present invention, therefore, we perform the chlorination of the magma in the presence of some amount of a previously chlorinated magma. In chlorinating a number of successive batches, the batch of magma in each case being made with the aid of a certain amount, say, about one-third, of a previously made chlorinated batch of magma, the concentration of the permanganate in the liquor accompanying the portion of the chlorinated material withdrawn can be steadily built up. For example, if roasted manganate material be made into a magma with a sufficient amount of water to bring into solution an amount of sodium manganate corresponding to 80 to 90 grams per liter (calculated as sodium permanganate) on chlorination liquors are obtained containing permanganate equal to 110 to 120 grams per liter. This corresponds to a total conversion of all the manganate present into permanganate and a further formation of permanganate at the expense of some of the hydrated manganese dioxid. After the chlorination is completed, if about two-thirds of the magma be withdrawn and fresh roasted manganate material and water supplied to make up the volume of the original batch and then chlorination resumed, a considerably richer liquor is obtained on the completion of chlorination. By repeating this operation several times, it is possible to obtain a concentration of permanganate in the liquor of the withdrawn portion of the magma of over 200 grams per liter. Such rich liquors are of course much more economical to handle than the weaker liquors obtained by chlorination of a magma of roasted manganate material made with water alone. We do not however aim to carry the described operation further than to obtain liquors of about the richness stated, that is, carrying about 200 grams per liter, or 20 per cent.; this being for various reasons. One is that a liquor of this richness is convenient in the further manipulations necessary in recovering permanganates, and another is that if enrichment be carried further impurities tend to build up in the mixture. After building up the concentration to about the richness stated (about 20 per cent.) in continuing the operation we do not ordinarily use so much returned magma as stated (a third of the volume) but lessen the returned quantity materially.

In operating in the manner described, a materially improved yield of permanganate is obtained from the manganate roast.

In a specific embodiment of the present invention, manganese oxids are mixed with soda and submitted to an oxidizing roast; this being advantageously done in the manner described and claimed in a prior Patent No. 1,254,521. The hot oxidized material is cooled and comminuted if necessary and made into a magma with water, such an amount of water being used as will give a solution carrying manganese to the extent of 11 or 12 per cent. (calculated as sodium permanganate). To this mixture of water and roasted material is added about one-half of its volume of a prior completely chlorinated magma of the kind—one-third the volume of the prior batch. The mixture of fresh magma and chlorinated magma is now chlorinated at a temperature of 60 to 70° C. until the reaction by the chlorin is substantially complete. It is a useful expedient to have various metallic catalysts, such as oxids of cobalt, copper, nickel, etc., present during this operation. After completion of the operation about two-thirds of the batch is withdrawn and sent to a suitable filtering apparatus or the like to separate the permanganate liquor from the insoluble material. The unfiltered or reserved portion of the chlorinated batch is used in making up a fresh batch for chlorination. The filtered liquor is concentrated to obtain permanganate in the usual manner. If potassium permanganate is desired and a sodium manganate melt has been used, the liquor may be treated with potassium chlorid in the known manner prior to concentration. The press cake, which contains manganese, is utilized in suitable ways. It is usually washed and the wash water, which contains permanganate, is used in lieu of water in making a magma. The wash water usually averages 20 to 50 grams of permanganate per liter, or 2 to 5 per cent.

What we claim is:—

1. In the manufacture of permanganate from materials containing manganates and of the nature of a manganate roast the process which comprises making a magma of such a material with a liquid containing dissolved permanganate and chlorinating the mixture.

2. In the manufacture of permanganates the process which comprises roasting manganese oxids with alkali under oxidizing conditions, making a magma of the roasted material with water and a portion of chlorinated magma, and chlorinating the mixture so produced.

3. In the manufacture of permanganate liquors containing large proportions of permanganate in solution the process which comprises taking up a manganate roast with water and chlorinating, withdrawing a portion of the chlorinated material, admixing the residue with fresh roasted material and water and chlorinating the mixture so produced.

4. In the manufacture of permanganates, the process which comprises chlorinating an admixture of water and a manganate roast with a previously chlorinated mixture of a similar kind, the proportion of fresh material to prechlorinated material being about 2:1.

5. In the manufacture of permanganate liquors the process which comprises submitting a mixture of alkali and manganese oxid to an oxidizing roast, making a batch of magma of the roasted material with the aid of permanganate—containing washings from a later operation and of a reserved chlorinated material from another similar operation, chlorinating the magma, withdrawing a portion of the chlorinated material while reserving the remaining portion for making another batch, separating a permanganate solution from residual solids in the withdrawn portion, washing the solids and returning the washings for use in making said other batch.

In testimony whereof we hereunto affix our signatures.

JOHN R. MacMILLAN.
JOSEPH L. K. SNYDER.